United States Patent [19]

Blangetti

[11] Patent Number: 4,776,170

[45] Date of Patent: Oct. 11, 1988

[54] DEVICE FOR DEGASSING THE CONDENSATE IN THE CYCLE OF AN ELECTRICITY GENERATING PLANT

[75] Inventor: Francisco Blangetti, Wettingen, Switzerland

[73] Assignee: BBC Brown, Boveri & Company, Ltd., Baden, Switzerland

[21] Appl. No.: 905,511

[22] Filed: Sep. 10, 1986

[30] Foreign Application Priority Data

Sep. 20, 1985 [CH] Switzerland .................. 4097/85

[51] Int. Cl.[4] ............................................. F01K 19/00
[52] U.S. Cl. ......................................... 60/689; 60/685; 60/692
[58] Field of Search .................. 60/646, 657, 685, 689, 60/692, 688, 690

[56] References Cited

U.S. PATENT DOCUMENTS 3,327,774  6/1967  Forster .
4,631,925 12/1986  Ohtake et al. .................. 60/692 X

FOREIGN PATENT DOCUMENTS 134457   6/1984  European Pat. Off. .
116946   8/1984  European Pat. Off. .
152920   8/1985  European Pat. Off. .
2228931 12/1974  France .
100287   8/1981  Japan ........................... 60/692

Primary Examiner—Stephen F. Husar
Attorney, Agent, or Firm—Burns, Doane, Swecker & Mathis

[57] ABSTRACT

In a device for degassing the feed-water line in the cycle of, for example, a nuclear heated electricity generating plant, steam bubbles are introduced into the condensate beneath the water level in the condensate collecting vessel via spray nozzles in order to solve the acute steam generator corrosion problems. For this purpose, a flow channel, in which the condensate follows a particular path to the hot well is provided in the vessel. Several spray nozzles are provided spaced out in the flow direction of the condensate. The steam/gas mixture escaping from the condensate is guided in counterflow to a steam balance opening which is located in the intermediate floor in the entry region of the flow channel the intermediate floor screening the vessel from the condensation space of the condenser.

13 Claims, 1 Drawing Sheet

DEVICE FOR DEGASSING THE CONDENSATE IN THE CYCLE OF AN ELECTRICITY GENERATING PLANT

BACKGROUND OF THE INVENTION

The invention generally relates to a device for degassing the condensate in the cycle of an electricity generating plant whose main cycle consists essentially of steam generator, turbine, condenser, low pressure and high pressure preheaters and the necessary circulating pumps.

Oxygen dissolved in the feed-water, dissolved copper and other corrosion products carried by the feed-water have been identified as the agents promoting corrosion in the steam generators of pressurized water reactor plants. For this reason, great efforts have recently been made to keep the oxygen content in the feed-water as low as possible, to eliminate the dissolved copper by the replacement of every copper alloy tube in the feed-water circuit and to separate corrosion products before they reach the steam generator. This is all the more important because the replacement of the steam generator for a power station of the 1,000 MW class leads to costs of approximately 100 million dollars. Reduction of the oxygen content in the feed-water also reduces the corrosion of the feed-water train and the preheaters.

Oxygen is dissolved in the feed-water or in the condensate whenever air comes in contact with the water. This is, for example, the case:

during cold starting of a plant because all the parts of the plant are under air pressure before they are filled with condensate and it is not possible to remove all the air from the feed-water/steam circuit by the start-up evacuation;

during low-load operation because the suction capacity of the vacuum pumps for the air introduced cannot, from economic considerations and for reasons of feasibility, be selected sufficiently large for all parts of the condenser bundle to be adequately flushed with steam;

during normal load operation because, despite adequate suction capacity, the air concentration becomes so great towards the end of condensation, i.e. towards the air cooler, that measurable oxygen concentrations result;

because even during normal load operation, many condenser designs have zones in which air collects;

because during the treatment of make-up water, the cleaned desalinated make-up water is washed through with air in order to drive out carbon dioxide and is therefore 100% saturated with air.

Copper is, for example, dissolved from the wetted metal surfaces of copper alloys in the presence of ammonia and oxygen or is carried into the feed-water by erosion or corrosion of these metal surfaces. It is mainly during outage periods that corrosion products and other impurities collect in the feed-water.

Specialists are currently of the opinion that a maximum oxygen content of less than or equal to 10 ppb (part per billion) should be the target value over the whole of the operating range of the plant.

In good condensers, i.e. those with a proven good degassing capability, oxygen contents of less than or equal to 5 ppb have been found in the condensate in the load range between 40 and 100%. The make-up water is then degassed in the condenser itself. During a cold start of such a plant and in low-load operation, however, about 70 ppb has been measured in the hot well of the condenser. These oxygen contents would have to be further reduced.

The following proposals for solving the corrosion problem were discussed at the EPRI Condenser Seminar in June 1983 in Orlando, Fla.:

(a) Start-up degassing and low-load degassing by spraying recirculated feed-water over the tubes of the condenser. This idea only leads to success if the available suction capacity is larger than the suction capacity necessary for oxygen contents of less than or equal to 10 ppb. This can only be expected at loads from 30 to 40%. This is because spraying heated condensate over the condenser bundle only has the desired effect if the condensate does not have to pass through zones of larger air concentrations at any part of the path traversed by the condensate. Furthermore, it is impossible to clean the whole of the feed-water circuit by condensate recirculation.

(b) Increasing the suction capacity in the low-load range by reducing the steam content of the suction flow using condensation by mixing. Condensation by mixing, however, can only condense part of the water vapour from the suction mixture; the suction unit must still remove all the air and this is generally only possible at condenser pressures which are above the "idling pressure" of the condenser.

(c) Extra degassing of the condensate in the hot well by means of included drip features. In the case of such drip features, sufficient height must be available for their inclusion.

(d) Extra degassing of the condensate in the hot well by blowing in steam under the water level. Steam blowing requires a sufficiently large covering of condensate and a sufficiently fine steam distribution in the condensate.

OBJECTS AND SUMMARY OF THE INVENTION

The object of the present invention is to provide condensate or feed-water degassing, which is particularly required due to steam generator corrosion problems, above all for the normal operating load and to optimize it for part-load.

The present invention provides a particularly favorable solution to degassing problems in electricity generating plants in which the time for degassing before the start-up of the plant is reduced to a minimum and in which degassed feed-water is provided over the whole of the operating range without any substantial losses in condenser vacuum having to be accepted.

BRIEF DESCRIPTION OF THE DRAWINGS

A preferred embodiment of the invention is shown diagrammatically in the drawing accompanying, in which.

Figure 1:
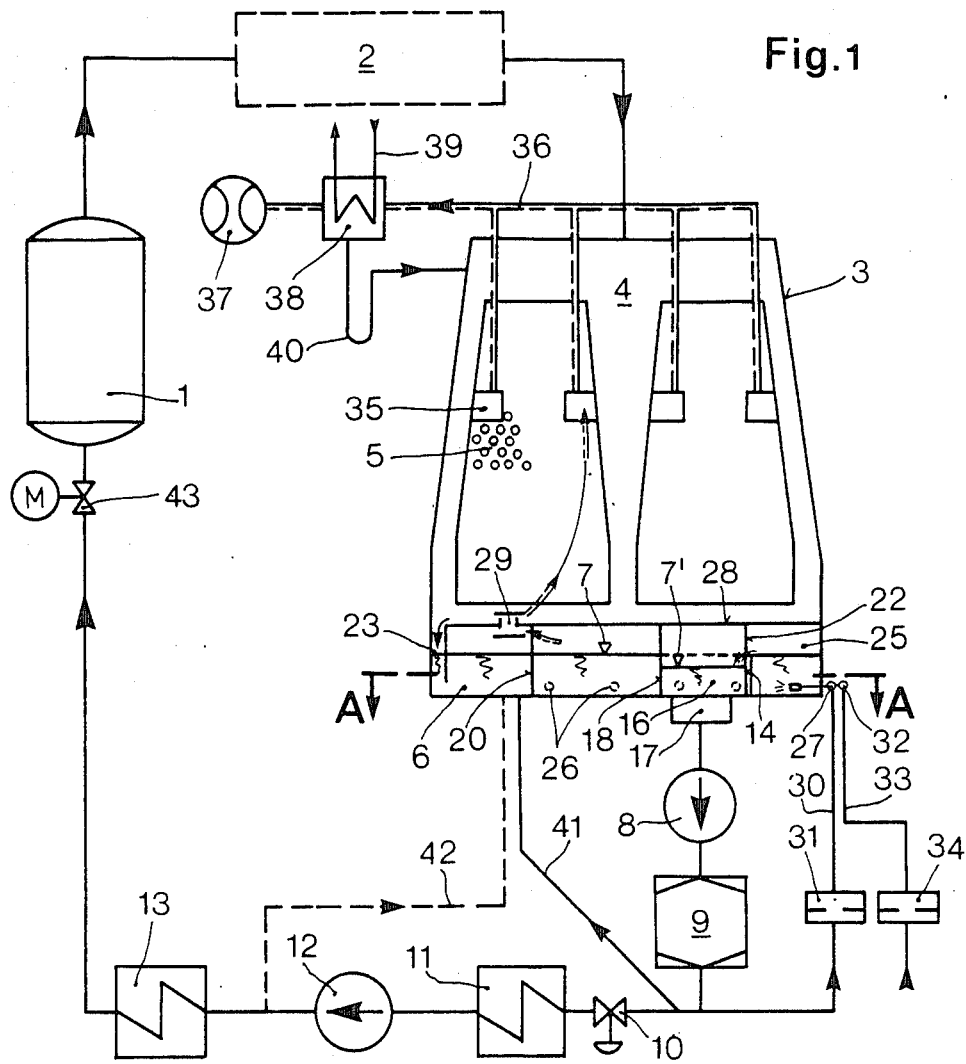
FIG. 1 shows a greatly simplified plant diagram.
Figure 2:
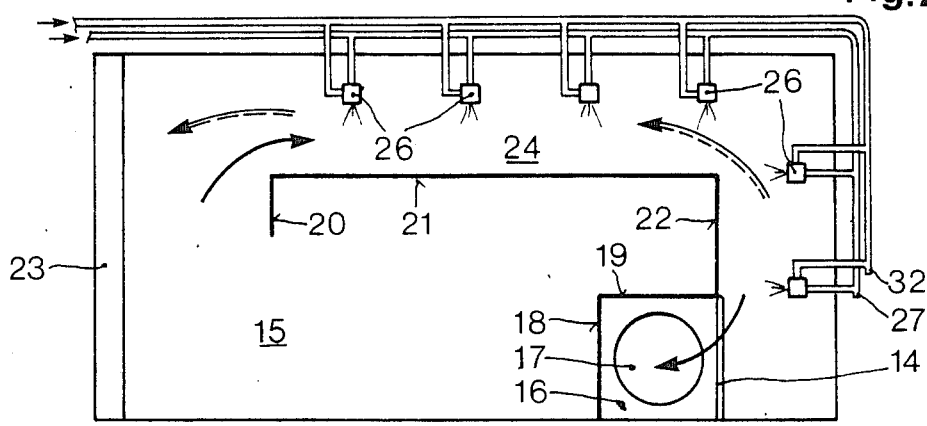
FIG. 2 shows an enlarged cross-sectional view through the condenser along the line A—A in FIG. 1.

In the drawings all the parts of the plant which are not essential to understanding the invention such as, for example, the actual steam cycle and the numerous shut-off valves obviously required in the pipework, are omitted. The flow directions of each of the various media are indicated by arrows.

DETAILED DESCRIPTION OF THE PREFERRED EMBODIMENT

Referring now to FIG. 1, a nuclear heated steam generator is indicated by 1. In normal operation, the saturated steam produced in it is expanded down to the condenser pressure in the turbine plant 2, which is not shown in any more detail. In the condenser 3, the steam is precipitated in the condensation space 4 on the water-cooled tube bundles 5; the condensate is collected in the condensate collecting vessel 6. A condensate pump 8 pumps the condensate through a condensate cleaning plant 9, from where it passes via the hot well control valve 10 into the low pressure preheaters 11, of which only one example is symbolically represented. In the present example, it is also assumed that a plant without a mixing preheater is involved and hence also without the usual mixing preheater degassing stage, i.e. a plant such as is often found in the United States of America. From the low pressure preheaters, the feed pump 12 pumps the feed-water via the high pressure preheaters 13, of which only one example is represented, into the steam generator 1.

Air cooler zones 35, which are known per se, are located within the tube bundle 5 in the condensation zone and from these air cooler zones, the uncondensed gases, together with a certain proportion of steam, are extracted via degassing pipes 36. This takes place by means of the vacuum pump 37. There is an additional condenser 38 in the degassing pipe before the vacuum pump 37 and this is operated with auxiliary cooling water 39 which is preferably colder than the main cooling water of the condenser 3. This additional condenser 38 is drained via a siphon 40 into the main condenser 3.

The condensate collecting vessel 6 is separated from the condensation space 4 by an intermediate floor 28. The two spaces are mutually connected by a steam balance opening 29. The condensate arising on the tube bundles 5 collects initially on the intermediate floor 28 and then flows vertically downwards via a slot-shaped condensate drain opening 23 directly beside the wall of the condenser into the vessel 6. The condensate collects on the bottom of the condenser, which is subdivided by means of a weir 14 into a larger compartment 15 and a smaller compartment 16. The smaller compartment 16 is the actual hot well and is provided with the sump 17. The subdivision and the overflow provide, on the one hand, correct inlet flow conditions to the condensate pump 8 and, on the other hand, the level control in the hot well is not adversely affected. The level triangles 7 and 7' indicate the respective water levels in the actual collecting vessel and in the hot well respectively.

The hot well 16 is bulkheaded from the large compartment 15 by the boundary walls 18 and 19. The boundary walls extend from the floor of the collecting vessel to the underside of the intermediate floor 28.

The condensate has to follow a particular path in the large compartment. For this purpose, an actual flow channel 24 is formed by the walls 20, 21 and 22 and it ends at the weir 14. The walls limiting the flow also extend from the bottom of the collecting vessel to the underside of the intermediate floor 28. The actual degassing is undertaken in this channel 24.

The most favorable dimensions for the best possible degassing may be explained by means of a numerical example: the weir is dimensioned in such a way that the height of the water in the flow channel, and hence in the collecting vessel is approximately 1,000 mm. The total height between the bottom of the condenser and the intermediate floor is approximately 1,400 mm so that a peripherally closed steam flushing chamber 25 with a clear height of 400 mm occurs between the water level 7, the intermediate floor 28 and the walls.

The steam balancing opening 29 already mentioned is provided in the intermediate floor 28 in the region of the inlet to the flow channel. As a variation from the configuration shown, in which the intermediate floor 28 passes underneath the whole of the tubed condensate zone—in order to avoid the condensate precipitating from the bundles being mixed with the substantially degassed condensate in the collecting vessel—it is also possible to cover over the flow channel 24 only. The condensate drain gutter 23 extending over the whole of the condenser width can then be omitted and it is possible to combine the steam balance opening 29 with the condensate drain gutter in one common apparatus.

In the case shown, the opening 29 is designed as a chimney (FIG. 1). It is protected above against dripping condensate by a plate; condensate entrained by the steam flow in the chamber 44 is separated on a lower impingement plate.

The minimum quantity of circulated condensate in the typical plant considered is approximately 40 kg/sec. The channel width is appropriately selected in order to achieve a condensate velocity of 0.2 m per second for the purpose of optimum degassing in the flow channel.

The actual degassing takes place by means of steam bubbles which are generated in the steam distribution units 26. These units are preferably commercial two-phase nozzles which are subjected to both liquid and steam. They are dimensioned in such a way that steam bubbles with a diameter of approximately 1 mm form at the outlet. Steam bubbles with a diameter of between 0.5 and 2 mm are basically suitable.

Several of these nozzles are arranged at a distance apart of about 800 to 1000 mm in the flow channel 24. They are located one after the other in the flow direction of the condensate, beginning in the inlet flow region and ending in the region of the weir 14. The nozzles are secured at a depth of between 500 and 1,000 mm, preferably about 900 mm, beneath the water level 7. Their outlet is directed horizontally in each case in order, among other reasons, to increase the time elapsed while the steam bubbles rise through the condensate.

The feed to the individual nozzles takes place via a circulating double pipe whose water pipe 27 branches off from the feed-water line via a pipe 39—advantageously, in fact, behind the condensate pump 8. In the present case, this takes place between the hot well control valve 10 and the condensate cleaning plant 9 so that cleaned water is used in each case. A throttle organ 31 is located in the water pipe 30 in order to throttle the existing water pressure down to the pressure which is necessary before the nozzle for the generation of bubbles. The steam pipe 32 of the circulating double pipe is connected to a steam pipe 33 of corresponding pressure, the pressure being again produced in a reducing organ 34. The steam source itself can be of several types. Thus, for example, it is possible to tap the auxiliary steam system (not shown), which is already active before the actual steam generation in the boiler 1, this auxiliary steam system being necessary for the provision of conservation steam and/or stuffing box steam. Other possible steam sources are live steam or tapped steam from the turbine plant 2, in which case it is only necessary therefore to ensure that low oxygen steam is, in each case, sprayed in.

The degassing process is now described using the start-up procedure for the plant. It is thus assumed that the plant is completely filled, i.e. the whole of the preheater line is filled up to a point directly in front of the closed steam generator isolating valve 43. The condensate pump 8 now circulates the water via the minimum rate pipe 41 using the condensate pump minimum rate, i.e. approximately 20% of the nominal load rate. Because the total rate of water is repeatedly admitted to the condensate cleaning plant 9, approximately 10 circulations are sufficient to separate out the corrosion products which have collected in the feed-water circuit before the low pressure preheaters 11, particularly during the outage period of the plant.

Although the feed-water now has the necessary quality from the standpoint of purity, it has become enriched with oxygen during the multiple circulations because all the air cannot be removed from the circuit at the time of the start-up evacuation.

The actual thermal degassing, effected by a supply of energy to the condensate, can now take place. For this purpose, the two-phase nozzles 26 are simultaneously fed with water and steam from the pipes 27 and 32 respectively. Depending on the type used, the pressure in front of the nozzle is between 1.5 and 2.5 bar. Because of the reduction in pressure taking place in the spray nozzles, the part of the condensate introduced evaporates and, together with the steam introduced, forms the steam bubbles of the desired diameter and these rise homogeneously through the condensate.

It should again be mentioned that a bubble diameter of about 1 mm is optimum for the water depth specified because, on the one hand, the elapsed time is not then long enough for bubbles to be extracted from the condenser through the sump 17; on the other hand, however, it is long enough for the necessary oxygen desorption to take place. The kinematics of this oxygen desorption is sufficiently known and it is not necessary to deal with the matter here.

The actual steam consumption for the formation of the bubbles is relatively small. The steam/water mass ratio varies in the order of value between 0.015 and 0.025. In the case of the degassing of approximately 40 kg/sec of condensate, this corresponds to a consumption of about 7 to 8 g of steam per second.

If the bubbles reach the surface of the water after a dwell period of between 5 and 10 seconds, a steam buffer is produced in the steam scavenging chamber 25 and this displaces the air which has remained up to this point via the steam balance opening 29. The steam flowing via the opening 29 is extracted from condenser 3 together with the condenser deaeration and is precipitated in the auxiliary condenser 38.

At this point, the particular advantage of the new counterflow arrangement now becomes apparent. The condensate, which flows through channel 24 in the direction of the sump 17, is treated with steam bubbles several times one after the other so that its oxygen content decreases successively. In contrast, the flushing steam escaping from the condensate and also guided along a particular path in the chamber 25 has the lowest oxygen concentration in the region of the sump 17. As it flows away, the oxygen content in the flushing steam increases steadily and reaches its maximum value in front of the first nozzle 26 in the region of the balance opening 29.

If the feed-water degassing to the necessary level has taken place, exhibiting, for example, an oxygen content less than 10 ppb, which can be indicated by simple measurement in or after the condensate collection vessel 6, the primary cleaning and degassing phase is thus at an end. The filling of the steam generator 1 then follows and steam generation then occurs.

The running-up phase during the starting of the plant and the bypassing of the turbine necessary for this purpose are not essential to the invention and can be neglected in the present connection.

It is now assumed that a certain part-load is being run. For condensation purposes, the cooling water rate absolutely necessary will only now be permitted to circulate. Up to a certain part-load, it is preferable to put only a part, for example one half, of the condenser into operation. At this stage, in fact, the highest possible pressure is desirable in the condensation space 4 in order to completely maintain and exploit the suction capacity of the vacuum pump 37. This means that the arriving steam is not fully condensed in the condensation space but fills the space and thus displaces the air is still present. The air/steam mixture extracted via the degassing pipes 36 initially flows through the auxiliary condenser 38 which, as already mentioned, is operated with auxiliary cooling water 39, which preferably has a lower temperature than the main cooling water. The degassing capacity of the vacuum pump 37 is effectively increased by the reduction of its steam content in the auxiliary condenser. This is therefore particularly advantageous because the vacuum pump usually has an inadequate suction capacity at low-load operation. The condensate precipitated in the auxiliary condenser 38 is fed back to the main condenser; the siphon 40 is located in the pipe provided for this purpose because of the pressure difference between the auxiliary condenser 38 and the condensation space 4.

In the operating phase just described, the tube bundles 5 still contain air fields in which the condensate occurring is enriched with oxygen because the suction capacity is still inadequate. Because of this, it requires extra degassing, which is carried out in the same manner as previously described in the collecting vessel. For this purpose, it can be advantageous to introduce live steam or tapped steam into the steam pipe 32.

It is desirable for the extra degassing to remain in operation up to about 40% load, i.e. until the vacuum pump 37 is itself capable of avoiding the accummulations of air. However, in the case of poor condenser designs which exhibit zones with unavoidable air pockets even in normal load operation, it is not possible to avoid operating the extra degassing permanently. The fact that the steam quantity required for this purpose is not available for expansion in the turbine or for preheating is only mentioned in passing.

The invention is not, of course, limited to the application shown and described, and it should be recognized that variations and changes may be made therein without departing from the invention as set forth in the claims that follow. Thus, as a deviation from the horizontal steam bubble injection described, vertical injection could also be considered if the then necessary depth of water is present. This could be the case in plants in which a separate module is used for degassing because, for example, there is not sufficient area over the condenser floor because of space limitations. Flow channels of a meander shape are conceivable, particularly in the so-called overfloor arrangements, in which the condenser floor itself acts as the level controlled hot well. As a deviation from what has been described, the condensate can be circulated with the minimum rate of the feed pump 15 via the (dashed) pipe 42 during the primary degassing. By this means, corrosion products which have collected in the low pressure preheaters 11 are also precipitated in the condensate cleaning plant 9.

Finally, it would also be conceivable to carry out the recirculation for the primary degassing via a pipe which branches off between the high pressure preheater 13 and the isolating valve 43. By this means, all the impurities from the preheater line could be removed.

What is claimed:

1. A device for degassing condensate in the condenser in a main cycle of an electricity generating plant having, in addition to the condenser, a steam generator, a turbine, low pressure and high pressure preheaters and circulating pumps, comprising:
   a collecting vessel located below the condenser and formed by walls that extend over the complete height of the collecting vessel to define a flow channel for condensate flowing away to a condensate pump;
   a plurality of steam spraying means located in spaced-apart relationship to one another beneath the normal water level in the flow direction of the condensate in said flow channel, said steam spraying means including two-phase nozzles connected to receive both low oxygen steam and recirculated condensate;
   a peripherally closed flushing steam chamber located above the water level in said flow channel; and
   a steam balancing opening located in the inlet flow region of the flow channel to communicate between the condensation space of the condenser and the flushing steam chamber.

2. A device according to claim 1 wherein the two-phase nozzles are located at least 500 mm below the water level in the collecting vessel and are directed to eject a two-phase mixture of said steam and condensate horizontally.

3. A device according to claim 1 wherein the two-phase nozzles are located about 900 mm below the water level.

4. A device according to claim 1 wherein the two-phase nozzles are dimensioned for generating steam bubbles with diameters ranging from about 0.5 mm to about 2 mm.

5. A device according to claim 4 wherein the two-phase nozzles are dimensioned for generating steam bubbles with diameters of about 1 mm.

6. Apparatus for degassing condensate formed in a condenser associated with a steam generator in an electrical generating plant, comprising:
   liquid flow channel means mounted to convey flowing condensate from the condenser to a collecting vessel;
   a plurality of steam spraying means mounted at spaced apart locations along the flow channel means in the direction of liquid flow for injecting steam into flowing condensate to form bubbles, said steam spraying means including means for injecting water together with steam into the condensate; and
   venting means mounted adjacent the inlet opening to the flow channel means to vent bubbles from the flow channel means into the condenser for removal from the system.

7. Apparatus according to claim 6 wherein the flow channel means is located in a collecting vessel mounted below the floor of the condenser.

8. Apparatus according to claim 7 wherein the venting means includes a steam balancing opening forward through the floor of the condenser in communication with the area above the normal water level in said collecting vessel.

9. Apparatus for degassing condensate formed in a condenser associated with a steam generator in an electrical generating plant, comprising:
   liquid flow channel means mounted to convey flowing condensate from the condenser to a collecting vessel;
   a plurality of steam spraying means mounted at spaced apart locations along the flow channel means in the direction of liquid flow for injecting steam into flowing condensate to form bubbles, said steam spraying means including two-phase nozzles connected to receive both low oxygen steam and recirculated condensate; and
   venting means mounted adjacent the inlet opening to the flow channel means to vent bubbles from the flow channel means into the condenser for removal from the system.

10. Apparatus according to claim 9 wherein the two-phase nozzles are located at least 500 mm below the water level in the liquid flow channel means and are directed to eject a two-phase mixture of said steam and condensate horizontally.

11. Apparatus according to claim 10 wherein the two-phase nozzles are dimensioned for generating steam bubbles with diameters ranging from about 0.5 mm to about 2 mm.

12. Apparatus according to claim 11 wherein the two-phase nozzles are located about 900 mm below the water level.

13. Apparatus according to claim 12 wherein the two-phase nozzles are dimensioned for generating steam bubbles with diameters of about 1 mm.

* * * * *